Figure 1:
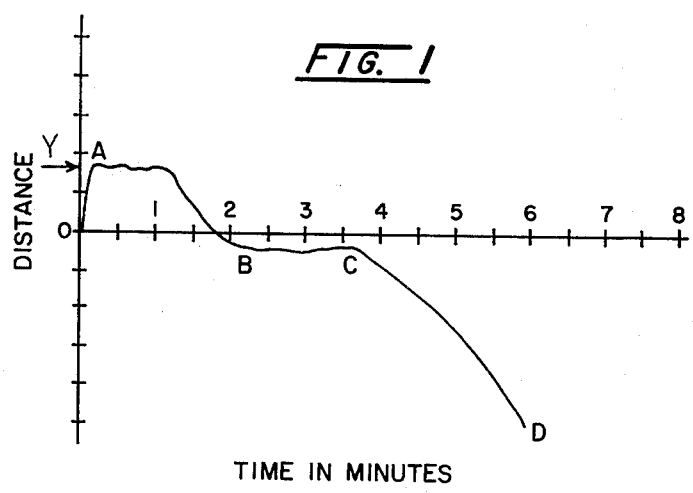
Figure 2:
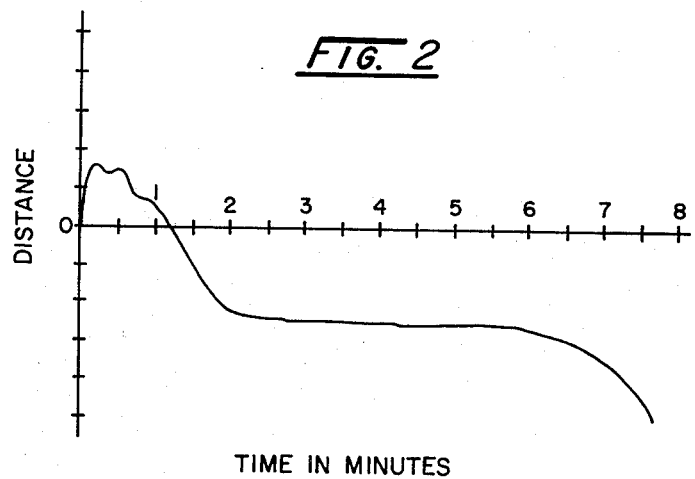
Figure 5:
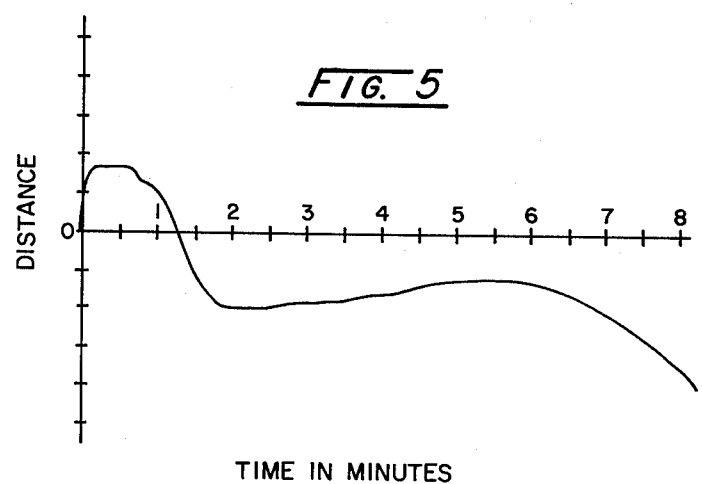
Figure 6:
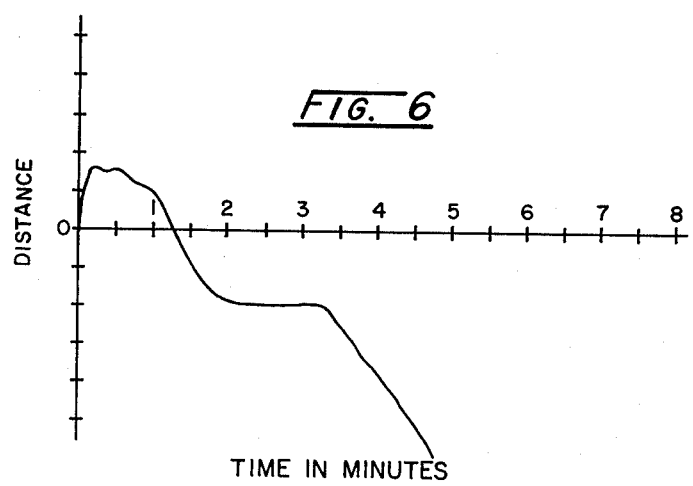
Figure 7:
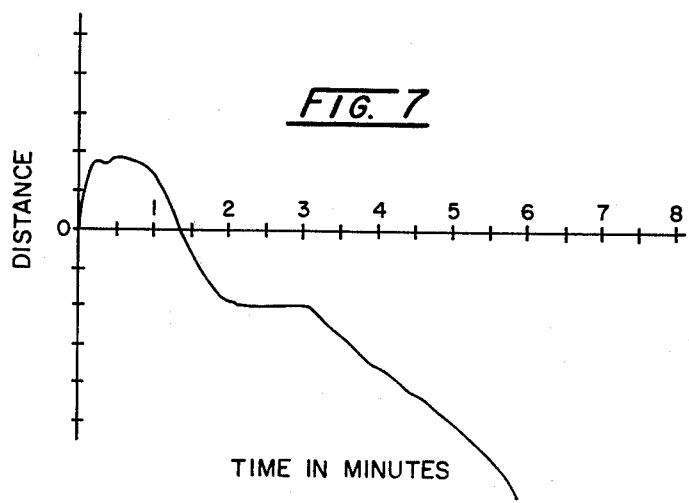

United States Patent [19]

Golden et al.

[11] 4,250,076
[45] Feb. 10, 1981

[54] FOUNDRY MOLDING COMPOSITIONS

[75] Inventors: Ronald Golden, Louisville, Ky.; Matthew S. Kulaga, New Albany; Stephen Shatynski, Floyd Knobs, both of Ind.

[73] Assignee: Borden, Inc., Columbus, Ohio

[21] Appl. No.: 38,801

[22] Filed: May 14, 1979

[51] Int. Cl.$^3$ .................................................. C08K 3/36
[52] U.S. Cl. .................................. 260/38; 260/19 R; 260/998.18
[58] Field of Search ............. 260/38, DIG. 40, 998.18

[56] References Cited

U.S. PATENT DOCUMENTS

| | | | |
|---|---|---|---|
| 2,806,832 | 9/1957 | Drumm et al. | 260/38 |
| 2,888,418 | 5/1959 | Albanese et al. | 260/DIG. 40 |
| 3,020,254 | 2/1962 | Less et al. | 260/38 |
| 3,118,850 | 1/1964 | Cooper | 260/38 |
| 3,485,797 | 12/1969 | Robins | 260/38 |
| 3,709,849 | 1/1973 | Lemon et al. | 260/29.3 |
| 4,051,098 | 9/1977 | Takemura et al. | 260/38 |
| 4,089,837 | 5/1978 | Luttinger et al. | 260/38 |
| 4,157,993 | 6/1979 | Funabiki et al. | 260/38 |

*Primary Examiner*—Melvyn I. Marquis
*Attorney, Agent, or Firm*—George P. Maskas; Kenneth P. Van Wyck; Daniel D. Mast

[57] ABSTRACT

These compositions comprise sand, a novolac binder resin and a hot distortion additive comprising a modified novolac resin which is prepared by co-reacting an alkylphenol with phenol and formaldehyde or by post-alkylating the novolac resin by means of alkylating compounds selected from alkenes, vinyl benzenes and unsaturated alicyclic compounds.

6 Claims, 7 Drawing Figures

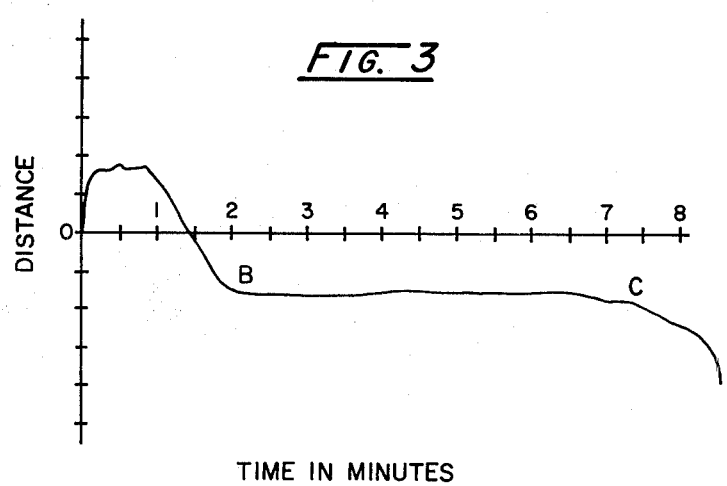
TIME IN MINUTES
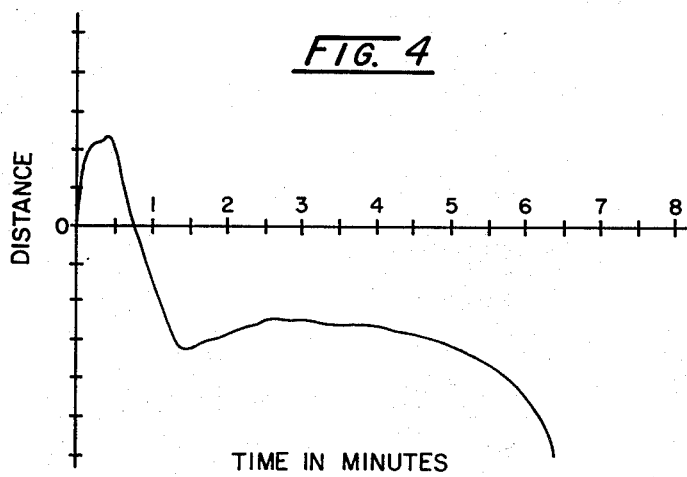
TIME IN MINUTES

FOUNDRY MOLDING COMPOSITIONS

This invention relates to compositions for use in the preparation of foundry molds and cores. More particularly, this invention relates to foundry molding compositions comprising sand particles coated with a phenolic binder containing a hot distortion additive which is particularly adapted for use in the shell molding process, although it can also be used in other processes such as hot box, no bake, cold box, and others used in the foundry industry. The additive is selected from partially alkylated phenol-formaldehyde novolac resins wherein the alkylating groups are selected from alkyl radicals containing 1 to 22 carbon atoms, alkene radicals containing 3 to 22 carbon atoms, alkylbenzene groups containing 8 to 12 carbon atoms, saturated and unsaturated alicyclic groups containing 6 to 20 carbon atoms, and mixtures thereof.

In preparing shell mold sections pursuant to the shell mold process, a foundry molding composition comprising coated sand particles is brought into contact with a metal pattern preheated to a temperature of 400° to 700° F. The resin adjacent the heated pattern softens under the influence of heat and flows around the sand grains to form a lightly adherent shell on the pattern. The time of contact and the temperature of the pattern determine thickness of the shell with a given foundry composition. After a shell of the desired thickness has had time to build up or invest in the pattern and conform to the contour thereof, the excess non-adhered sand is removed from the pattern and the pattern with the adhered shell is then baked at an elevated temperature in the range of about 400° to 700° F. in order to advance the novolac resin to its final stage to form a rigid, self-sustaining thermoset shell mold conforming to the shape of the metal pattern. Upon cooling, the hardened shell mold is stripped from the pattern in preparation for assembly and metal casting operation. The shell mold wall thickness may range from about 0.1 to 0.5 of an inch and more.

Modern molding methods based on the use of chemical binders all have one aim in common: to produce a mold or core of consistent dimensional accuracy and hence, a casting satisfying the increasingly stringent demands of present day specifications. This dimensional accuracy is attained by causing hardening of the bonded sand to take place within the confines of a hot or cold pattern with minimum of dimensional distortion taking place due to thermal effects.

Both hot and cold foundry molding processes achieve consistent dimensional accuracy successfully as far as room temperature dimensions are concerned. Bonded sand, however, undergoes considerable dimensional changes when subjected to heat from molden metal, i.e., thermal expansion, distortion, and breakdown which the core or mold undergoes under casting conditions. These factors are directly related to the type of binder and sand used.

Dimensional accuracy, physical strength and surface hardness of a core or mold at room temperature bear little or no relationship to performance during casting operations. At casting temperatures, the core or mold may expand and crack, bend and warp, or erode and soften to give poor quality castings. To produce castings of consistent quality, it is important to know high temperature properties of cores and molds as to their expansion, whether they are likely to crack, and how liable they are to plastic deformation and bending.

It is well known in the foundry molding art to provide additives to either sand or organic resin binder to control thermal expansion of coated sand which can cause distortion and cracking, leading to casting defects. Typically, a plasticizer is added to the binder to reduce high temperature brittleness, allowing the sand particles to expand without cracking the core or mold.

The conventional plasticizing additive for improving hot distortion properties in foundry molds and cores in Vinsol, a glycerol ester of a dark, hydrocarbon-insoluble pinewood resin. Vinsol, however, being a product of nature, has limited availability and produces substantial smoke and odor when pyrolyzed by hot liquid metal. The use of this product has become increasingly objectionable due to the current emphasis on environmental protection and to lack of a reliable supply thereof.

Accordingly, one objective of this invention is to provide an additive to organic foundry binders which imparts improved plasticity and hot distortion properties to foundry cores and molds. Another objective is to provide an additive which results in reduced emissions of smoke and odor in the preparation of castings in the foundry cores and molds. Still another objective is to provide a synthetic additive which performs as well as or better than the conventional additive without being subject to limited availability.

FIGS. 1 to 7 herein are graphs obtained in hot distortion tests of test pieces prepared with a binder containing partially alkylated novolac as the hot distortion additive. The numbered figures correspond to the numbered examples which illustrate preparation of various additives.

Pursuant to the invention described herein, a foundry molding composition is prepared from sand, phenolic binder and an additive selected from partially alkylated novolac resins. The additive is selected from partially alkylated novolac resins wherein the alkylating groups attached to the benzene rings are selected from alkyl radicals containing 1 to 22 carbon atoms, alkene radicals containing 3 to 22 carbon atoms, alkylbenzene groups containing 8 to 12 carbon atoms and saturated and unsaturated alicyclic groups containing 6 to 20 carbon atoms, preferably 6 to 10 carbon atoms.

The additive described herein provides improved hot distortion properties and low emission of smoke and odor with respect to foundry molds and cores made from molding compositions containing same. Other advantages of the subject additives include lower levels thereof that are required to attain substantially the same results when compared to Vinsol in terms of hot distortion properties and their lower melting points vis-a-vis Vinsol which translates into lower energy requirements and other advantages.

The hot distortion additives are produced by incorporating alkylphenols as co-reactants with phenol and formaldehyde during preparation of conventional novolac resins. Suitable alkylphenols include o-alkylphenols, p-alkylphenols, o- and p- dialkylphenols, and mixtures thereof. The alkyl radical is selected from linear and branched, saturated and unsaturated hydrocarbon groups containing 1 to 22 carbon atoms. Typical examples of specific alkylphenols suitable for our purpose include cresols, xylenols, isopropylphenols, diisopropylphenols, isopropylidenephenols, butylphenols, amylphenols, octylphenols, nonylphenols, hexadecylphenols and cardanol.

The additives can also be prepared by partially alkylating conventional novolac resins with ethylenically unsaturated compounds selected from linear alkenes, branched alkenes, vinyl benzenes and unsaturated alicyclic compounds. The unsaturated linear and branched alkenes contain about 3 to 22 carbon atoms, examples of which include hexenes, octenes, nonenes, decenes, ethylhexenes, pentyldecenes, and polyunsaturated alkenes such as myrcene. The vinyl benzenes contain about 8 to 12 carbon atoms and are selected from styrene, vinyltoluene, indene and alphamethylstyrene. The unsaturated alicyclic compounds suitable for manufacture of the additives of the invention contain about 6 to 20 carbon atoms, preferably 6 to 10, and include vinylcyclohexenes, cyclohexene, dicyclopentadiene, pinenes, camphenes dipentenes and other terpenes.

It is hypothesized that in the post-alkylation reaction described herein, the polymer backbone of the novolac resin remains essentially unchanged, and alkylating groups are attached to the benzene ring at the preferred ortho or para positions or both. Description herein of alkylating a novolac resin is illustrative of one known approach for alkylating aromatic ring compounds among others that are well known to those skilled in the art. It is intended that the claims herein cover the obvious modifications known to those skilled in the art as to alkylation of a novolac resin. In reference to preparation of the additive by co-reaction of an alkylphenol with phenol and formaldehyde, it is believed that the alkylphenol enters into the reaction and becomes a part of the polymer backbone. In this case, the alkylating groups are introduced into the polymeric structure by virtue of the presence of the alkylphenols in the polymer backbone.

Whether the additive is prepared by co-reaction of an alkylphenol with phenol and formaldehyde or by post alkylation of a novolac, it should be possible to prepare essentially the same product. In the co-reaction mode, an alkylphenol can be selected which will have any of the alkylating groups described above on the benzene ring. With such a co-reaction, it should be apparent that essentially the same product will be formed as by post-alkylating a novolac with the desired alkylating group(s) on the benzene ring.

Suitable weight or mol ratios in the additive, in terms of parts alkylphenol to the combined parts of alkylphenol plus phenol, can range from about 0.1 to about 0.9, and preferably from about 0.2 to about 0.7. Amount of the additive in the binder can vary from about 1 to about 50 percent by weight, and preferably from 10 to 30 percent. Generally speaking, sufficient amount of the additive is used to obtain the desired improvement in the hot distortion properties.

The binder resin used to prepare resin-coated sand compositions of the present invention is selected from phenolic resins. Although resoles can be used, the preferred resin is selected from novolac resins. Such resins are well known in the art, as illustrated by the Less U.S. Pat. No. 3,020,254, and many others.

Phenol-formaldehyde novolac resins are generally prepared by the condensation of phenol with formaldehyde in the presence of an acid catalyst wherein the formaldehyde is present in the reaction mixture in less than stoichiometrically equivalent amounts and generally at a mole ratio of phenol to formaldehyde of about 1:0.4 to 1:0.9. Acids useful as catalysts in the preparation of the novolac resins include mineral acids such as hydrochloric acid and sulfuric acid, organic acids such as sulfonic acids such as p-toluene sulfonic acid and phenol sulfonic acid, carboxylic acids such as oxalic and maleic acids and Lewis acids such as zinc acetate and boron trifluoride.

In preparing the novolac resins, the acid catalyst is added to the reaction medium containing the phenol and formaldehyde reactants in a concentration of about 0.1 to 5.0 percent based on the weight of the phenol. The reactants are then heated to a temperature in the range of 80° to 160° C. until the content of free formaldehyde in the reaction medium reaches values of less than about 3 percent by weight, indicating that the reaction is substantially complete. Water in the resulting reaction product is then removed.

To convert the phenol-formaldehyde novolac resin into the thermoset state, a curing agent, such as formaldehyde, paraformaldehyde or hexamethylenetetramine is added to the resin. The curing agent most commonly used to convert phenol-formaldehyde novolac resin is hexamethylenetetramine, and this agent may be used in the practice of the present invention.

The binder resin can be used in amounts varying from about 1 to 10 percent, preferably 2 to 5 percent, based on the weight of sand. Amount of resin used will vary with the type of sand used, and almost any sand can be used for shell molding purposes.

It should be understood that the same novolac can be used as a binder resin as in making the additive. The essential difference being that the novolac resin is modified for its use as an additive by being partially alkylated, whereas an unmodified phenol-formaldehyde novolac is most commonly used as the binder resin.

The heat distortion properties are measured by means of the BCIRA heat distortion tester. In such a test, a test piece of bonded sand measuring $1 \times \frac{1}{4} \times 4\frac{1}{2}$ inches is loaded as a cantilever with downward load applied to the free end of the test piece and is then strongly heated in the center of the downward face thereof. Due to the differential thermal expansion between the hot face and the opposite upward cold face, the test strip curls upwardly away from the heat source. This amount of curl is measured and recorded as upward expansion. Due to the thermoplastic nature of the binder, a point in time is reached during heating when the bonded sand can no longer curl against the load, following which, reverse curling takes place. Amount of this reversed distortion is also measured and is recorded on the chart as downward distortion. Ultimately, further decomposition of the bond results in a loss of strength and the collapse of the test piece. Movements, such as those exhibited by the test piece, do in fact take place in normal cores and molds during casting, resulting in the distortion of thin cores and in the veining, cracking, erosion and spalling of molds. In this respect, the testing conditions simulate those occuring in actual foundry practice.

To illustrate hot distortion properties, a test sample was prepared in the usual manner with a binder novolac resin described in Example 1. The test was conducted with the BCIRA tester following a standard procedure. FIG. 1 represents a graph obtained by means of the BCIRA tester wherein the graph is charted on the basis of time vs. distance. Portion OA of the graph indicates the main upward thermal expansion against load, which is also indicative of hot strength. Distance YA is proportional to the time over which this expansion and hot strength persists. The maximum upward expansion is reached at point A after which, because of increasing temperature and thermoplasticity, the load can no longer be sustained and the downward portion of curve AB results. This is indicative of the thermoplasticity resulting from heating. Many binders undergo some thermosetting during this period, and at some point, the thermoplasticity may cease. In such a case, deviation of the test piece can remain substantially constant or further expansion against load can take place because some hot strength may have returned. This is shown as portion BC on the graph. Eventually, complete collapse of the test sample or breakdown takes place, as shown at point D.

Our invention is mainly directed at expanding the resistance to collapse portion of the curve BC which promotes a more uniform distribution and dissipation of thermal effects. This results in less veining, a more uniform surface and generally greater dimensional uniformity of the casting. In FIG. 1, portion BC represents about 1.6 minutes, which is considered to be insufficient. FIG. 3 represents a graph made by subjecting a test piece to the BCIRA test which was prepared using the binder of Example 3, which contained the hot distortion additive. The BC portion of this graph is 4.2 minutes, which is considered to be excellent. Generally speaking, BC portion or resistance to collapse time intervals in excess of about 2 minutes are indicative of molds and cores with acceptable dimensional stability.

The following examples are set forth to illustrate the invention relating to the use of partially alkylated novolac resins as hot distortion additives with conventional novolac binder resins which are used to mold sand for foundry applications. Although only novolac binder resin is illustrated, it should be understood that resole binder resins can also be used in conjunction with the hot distortion additive.

EXAMPLE 1

Conventional Hot Coating Resin 645 grams of phenol, 1.3 grams of concentrated sulfuric acid and 309 grams of 50 percent aqueous formaldehyde were heated at reflux, followed by atmospheric distillation to 140° C. 37 grams of powdered calcium stearate were added to the hot, molten resin and dispersed uniformly. This was followed by 25 grams of salicylic acid, which also was dispersed uniformly throughout the mass before cooling to a hard, resinous solid with a ring and ball softening point of about 90° C.

EXAMPLE 2

Post-Alkylated Novolac 625 grams of phenol, 262 grams of 50 percent aqueous formaldehyde and 8 grams of 25 percent sulfuric acid were heated at reflux and then distilled at atmospheric pressure to a temperature of 140° C. 344 grams of dipentene (dl-limonene) then were added over about 1 hour, controlling the exothermic reaction at about 130° to 135° C. by the rate of addition. After a short reaction at about 140° C., excess dipentene and water were removed. The hard, resinous product had a ring and ball softening point of 105° to 109° C.

EXAMPLE 3

Post Alkylated Novolac

A modified phenolic novolac resin was prepared by a procedure similar to Example 2, with the exception that alphapinene was used in place of dipentene.

EXAMPLE 4

Nonylphenol/Phenol Copolymer (30/70) F/P Mole Ratio 0.83

205 grams of nonylphenol and 479 grams of phenol were heated at reflux with 10.6 grams of 30 percent sulfuric acid, 300 grams of 50 percent aqueous formaldehyde and 50 cc of toluene. The product was distilled at atmospheric pressure to a temperature of 140° C. to give a solid amber resin with a ring and ball softening point of 122° C.

EXAMPLE 5

Nonylphenol/Phenol Copolymer (60/40) F/P Mole Ratio 0.66

880 grams of nonylphenol and 636 grams of phenol were heated at reflux with 420 grams of 50 percent aqueous formaldehyde and 21 grams of 30 percent sulfuric acid. The reaction product was distilled at atmospheric pressure to a temperature of 155° C., and then was further distilled under a vacuum of 28 inches to 165° C. The product was a hard, amber resin.

EXAMPLE 6

Pure Octylphenol Novolac 1150 grams of octylphenol were heated at reflux with 30 grams of oxalic acid and 300 grams of 50 percent aqueous formaldehyde. The reaction product was distilled at atmospheric pressure to 150° C., followed by slow application of vacuum up to 27 inches of mercury and temperature of 154° C. The hard, resinous product had a ring and ball softening point of 120° C.

EXAMPLE 7

Pure Nonylphenol Novolac 1050 grams of nonylphenol were heated at reflux with 240 grams of 50 percent aqueous formaldehyde and 4 grams of concentrated sulfuric acid. The reaction product was distilled at atmospheric pressure to a temperature of 150° C. to give a hard, resinous product with a ring and ball softening point of 93° C.

EXAMPLE 8

Prior Blending Of Additive For Improved Hot Distortion With A Conventional Hot Coating Resin A conventional hot coating resin was prepared as described in Example 1, and 20 parts by weight of the post-alkylated novolac described in Example 2 were added to 80 parts by weight of the molten resin and mixed until the additive was uniformly distributed throughout the mass.

EXAMPLE 9

Conventional Hot Coating Method 4 kg of Arrowhead silica sand with a 70 AFS fineness was heated to about 325° F. and stirred in a preheated Simpson muller. About 140 grams of a flaked conventional hot coating resin, typified by the product in Example 1, were added to the mixer and wet mulled for about 60 seconds to coat the molten resin uniformly on the sand. Then about 55 grams of a 40 percent aqueous solution of hexamethylenetetramine were added to the mixer, followed by about 25 grams of water. Mixing was continued for about 2 minutes while the resin is converted to a B stage and forms a dry coating on the sand. Finally about 2 grams of calcium stearate lubricant were added, and mixing was continued for a short period to distribute it uniformly over the coated sand grains before final discharge of the finished product.

EXAMPLE 10

Sequential Addition Of Resin And Additive 4 kg of silica sand was heated to about 350° F. and stirred in a preheated Simpson muller. About 30 grams of a flaked or powdered additive for improved hot distortion, such as described in Example 2 through Example 5, were added to the mixer, followed immediately by about 110 grams of the conventional hot coating resin described in Example 1.

The sequence of addition can be reversed, or the two materials can be dry-blended prior to addition to the mixer. The wet mull was continued for about 60 seconds, followed by about 55 grams of a 40 percent aqueous solution of hexamethylenetetramine and about 25 grams of quench water. Mixing was continued for about 2 minutes as the coating dries, and then about 2 grams of calcium stearate were added to coat the dry sand before discharging from the mixer.

EXAMPLE 11

Coating Pre-Blended Resin

About 140 grams of the resin described in Example 8 was hot coated on 4 kg of silica sand as described in Example 9 to give a coated sand which exhibits improved hot distortion properties.

EXAMPLE 12

Modified Warm Coating Resin

A conventional hot coating resin is prepared as described in Example 1, and 10 parts by weight of the post-alkylated novolac described in Example 2 are added to 100 parts by weight of the molten resin and mixed until the additive is uniformly distributed throughout the mass. The resin is diluted to about 70 percent solids with solvent, comprising 60/20/20 weight percent mixture of denatured ethanol, methanol and acetone, to give a viscous, resinous product.

EXAMPLE 13

Warm Coating Process

About 4500 grams of silica sand is charged to a Simpson muller, along with about 35 grams of a mixture of about 75 parts by weight of hexamethylenetetramine and 25 parts by weight of calcium stearate. After mixing for about 1 minute to distribute the mixture uniformly over the sand, about 200 grams of the modified warm coating resin described in Example 12 are added, and mixing is continued for about 2 minutes. Then hot air at about 350° to 400° F. is blown through the mixer, while stirring is continued until the coated sand is dry and free flowing. Coated sand prepared from the modified resin in this way has hot distortion properties superior to coated sand prepared from conventional warm coating resins.

EXAMPLE 14

Testing For Hot Distortion

Test pieces were prepared from the foundry compositions, as described in Example 9, by blowing the coated sand with 40 psi air pressure from a coreshooter into a corebox having internal dimensions of $1 \times \frac{1}{4} \times 4\frac{1}{2}$ inches. The corebox was heated to about 250° C. and the coated sand was cured for a period of 2 minutes. The test pieces were ejected from the corebox and allowed to cool standing on edge until they reached room temperature. The test pieces were then subjected to the BCIRA hot distortion test, which produced graphs shown in FIGS. 1 to 7, corresponding to Examples 1 to 7, respectively. Qualitative interpretations of these tests are tabulated below:

| EX. NO. | Additive | F/P mol ratio | % Added | Performance |
|---|---|---|---|---|
| 1 | — | — | — | poor |
| 2 | dipentene post-alkylated novolac (0.55/1 wt. ratio dipentene to phenol) | 0.66 | 10 | good |
| | | | 20 | excellent |
| 3 | alpha-pinene postalkylated novolac (0.55/1 wt. ratio alpha-pinene to phenol) | 0.66 | 20 | excellent |
| 4 | nonylphenol-phenol copolymer (30/70 wt. ratio) | 0.83 | 20 | fair |
| 5 | nonylphenol-phenol copolymer (60/40 wt. ratio) | 0.66 | 20 | excellent |
| 6 | octylphenol novolac | 0.9 | 20 | poor |
| 7 | nonylphenol novolac | 0.83 | 20 | poor |

The F/P mol ratio represents formaldehyde to phenol mol ratio, including alkylphenols and phenol; % added represents percent of the partially alkylated novolac resin added to the binder; and the numbers in parenthesis adjacent additive novolacs indicate relative composition of additive by weight.

The results presented above illustrate the unexpected hot distortion properties that are imparted by the use of an additive of sand molding compositions in foundry applications for casting molten metal. The phenolic binder in each instance was novolac resin and the additive was a partially alkylated novolac. The results presented in the above table also illustrate inoperability of novolac additives when phenol was replaced completely with octylphenol or nonylphenol, as demonstrated in Examples 6 and 7, respectively.

Reduction of smoke and odor has been previously mentioned as an advantage of our additive over what is currently used. This reduction is very significant and very substantial. Although it is difficult to quantify it, it is estimated that reduction in smoke and odor is on the order of 50%. It is also important to note another advantage, not previously mentioned. To obtain about the same level of heat distortion properties in the sand molds and core, a smaller amount of additive of the invention is required compared to Vinsol. Here again, it is difficult to quote exact figures since there are so many variables that can affect amount of the additive used, nevertheless, it is estimated that this amount is about 70 to 80% of the amount of Vinsol that is normally used in such compositions.

We claim:

1. A foundry composition comprising sand, from about 1% to 10%, based on the weight of said sand, of a phenol-formaldehyde binder resin to bind the sand particles together, and a sufficient amount of an additive to improve heat distortion properties of articles made from such composition, the additive being selected from partially alkylated phenol-formaldehyde novolac resins wherein the alkylating groups are selected from alkyl radicals containing 1 to 22 carbon atoms, alkene radicals containing 3 to 22 carbon atoms, alkylbenzene groups containing 8 to 12 carbon atoms, saturated or unsaturated alicyclic groups containing 6 to 20 carbon atoms, and mixtures thereof and said alkylated resins are selected from the group consisting of ortho alkyl, para alkyl and ortho and para dialkyl-substituted phenol-formaldehyde novolac resins and mixtures thereof.

2. Foundry molding composition of claim 1 wherein the additive is prepared by
  (2) co-reacting and alkylphenol with phenol and formaldehyde to prepare a novolac resin at a temperature of about 80° C. to 160° C. in the presence of an acid catalyst and wherein the weight ratio of alkylphenol to the combined weight of alkylphenol and phenol is about 0.1/1 to 0.9/1 and mol ratio of formaldehyde to combined mols of alkylphenol and phenol is about 0.4/1 to 0.9/1 wherein the alkyl radical is selected from linear and branched, saturated and unsaturated radicals containing 1 to 22 carbon atoms, or
  (b) post-alkylating a phenol-formaldehyde novolac resin with alkylating compounds selected from alkenes containing 3 to 22 carbon atoms, vinyl benzenes containing 8 to 12 carbon atoms, unsaturated alicyclic compounds containing 6 to 20 carbon atoms, and mixtures thereof wherein the weight ratio of alkylphenol to the combined weight of alkylphenol and phenol in the post-alkylated product is about 0.1/1 to 0.9/1 and mol ratio of formaldehyde to combined mols of alkylphenol and phenol is about 0.4/1 to 0.9/1.

3. Composition of claim 2 wherein the phenol formaldehyde binder resin is a novolac which is present in an amount of about 2 to 5%, based on the weight of sand.

4. Composition of claim 3 wherein amount of the additive is about 1 to 50%, based on the weight of the binder resin.

5. Composition of claim 4 wherein the additive is used in an amount of 10 to 30% and wherein the alkylating groups contain 6 to 10 carbon atoms.

6. Composition of 5 wherein the weight ratio of alkylphenol to the combined weight of alkylphenol and phenol is about 0.2/1 to 0.7/1.

* * * * *